United States Patent
Taghizadeh et al.

(10) Patent No.: US 11,889,292 B2
(45) Date of Patent: Jan. 30, 2024

(54) AUDIO PROCESSING APPARATUS AND METHOD FOR DENOISING A MULTI-CHANNEL AUDIO SIGNAL

(71) Applicant: HUAWEI TECHNOLOGIES CO., LTD., Shenzhen (CN)

(72) Inventors: Mohammad Taghizadeh, Munich (DE); Gil Keren, Passau (DE); Shuo Liu, Passau (DE); Bjoern Schuller, Passau (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 203 days.

(21) Appl. No.: 17/581,527

(22) Filed: Jan. 21, 2022

(65) Prior Publication Data

US 2022/0150661 A1    May 12, 2022

Related U.S. Application Data

(63) Continuation of application No. PCT/EP2019/069924, filed on Jul. 24, 2019.

(51) Int. Cl.
*H04S 7/00* (2006.01)
*G10L 21/0208* (2013.01)
*G10L 25/18* (2013.01)
*G10L 25/30* (2013.01)
*G10L 21/10* (2013.01)

(52) U.S. Cl.
CPC .......... *H04S 7/307* (2013.01); *G10L 21/0208* (2013.01); *G10L 21/10* (2013.01); *G10L 25/18* (2013.01); *G10L 25/30* (2013.01); *H04S 2400/03* (2013.01)

(58) Field of Classification Search
CPC . H04S 7/307; H04S 2400/03; G10L 21/0208; G10L 21/10; G10L 25/18; G10L 25/30
USPC .......................................................... 381/18
See application file for complete search history.

(56) References Cited

PUBLICATIONS

Lim et al., "Multi-level Stereo Attention Model for Center Channel Extraction," IEEE, International Symposium on Broadband Multimedia Systems and Broadcasting (BMSB), Jun. 5, 2019, pp. 1-4 (Year: 2019).*

(Continued)

*Primary Examiner* — Paul Kim
(74) *Attorney, Agent, or Firm* — Leydig, Voit & Mayer, Ltd.

(57) ABSTRACT

The disclosure relates to an audio processing apparatus, comprising: a plurality of audio sensors, each audio sensor configured to receive a respective plurality of audio frames of an audio signal from an audio source, wherein the respective plurality of audio frames defines an audio channel of the audio signal; and a processing circuitry configured to: determine a respective feature set having at least one feature for each audio frame of each of the plurality of audio frames, wherein the plurality of features define a three-dimensional feature array; process the three-dimensional feature array using a neural network, wherein the neural network comprises a self-attention layer configured to process a plurality of two-dimensional sub-arrays of the three-dimensional feature array; and generate an output signal on the basis of the plurality of processed two-dimensional sub-arrays. Moreover, the disclosure relates to a corresponding audio processing method.

14 Claims, 7 Drawing Sheets

(56) References Cited

PUBLICATIONS

Lim et al., "Multi-level Stereo Attention Model for Center Channel Extraction," IEEE, total 4 pages (2019).
Wang et al., "Non-local Neural Networks," 2018 IEEE/CVF Conference on Computer Vision and Pattern Recognition, 2018, doi: 10.1109/CVPR.2018.00813, pp. 7794-7803 (2018).
Huang et al., "Music Transformer: Generating Music With Long-Term Structure," Published as a conference paper at ICLR 2019, pp. 1-15 (2019).
Braun, S. et al.,"Multi-channel attention for end-to-end speech recognition," Interspeech 2018, Hyderabad, India, pp. 16-21 (Sep. 1, 2018-Dec. 5, 2018).
Zhang et al., "Self-Attention Generative Adversarial Networks," pp. 1-10 (May 21, 2018).
Bahdanau et al., "Neural Machine Translation by Jointly Learning to Align and Translate," pp. 1-15 (May 19, 2016).
Vaswani et al., "Attention Is All You Need," pp. 1-15 (Dec. 6, 2017).
Meng et al., "Deep Long Short-Term Memory Adaptive Beamforming Networks for Multichannel Robust Speech Recognition," ICASSP 2017, IEEE, pp. 271-275 (2017).
Afouras et al., "Deep Audio-Visual Speech Recognition," pp. 1-13 (Dec. 22, 2018).
Bagchi et al., "Combining Spectral Feature Mapping and Multi-Channel Model-Based Source Separation for Noise-Robust Automatic Speech Recognition," ASRU 2015, IEEE, pp. 496-503 (2015).
Qian et al., "Deep Learning Based Speech Beamforming, " total 5 pages (Feb. 15, 2018).
Sainath et al., "Speaker Location and Microphone Spacing Invariant Acoustic Modeling From Raw Multichannel Waveforms," ASRU 2015, IEEE, pp. 30-36 (2015).
Li et al., "Neural Network Adaptive Beamforming for Robust Multichannel Speech Recognition," in Interspeech 2016, total 5 pages (Sep. 2016).

* cited by examiner

| Signals | WER [%] |
|---|---|
| Clean | 20.88 |
| Nosiy Speech | 67.11 |
| Complete model | 40.61 |
| Enhancing subnetwork alone | 60.45 |
| Single-channel denoiser alone | 50.96 |
| BeamformIt | 61.27 |
| One rotational self-attention block | 43.61 |

Fig. 7

AUDIO PROCESSING APPARATUS AND METHOD FOR DENOISING A MULTI-CHANNEL AUDIO SIGNAL

CROSS-REFERENCE TO RELATED APPLICATIONS

This application is a continuation of International Application No. PCT/EP2019/069924, filed on Jul. 24, 2019, the disclosure of which is hereby incorporated by reference in its entirety.

TECHNICAL FIELD

The present disclosure relates to audio processing. More specifically, the disclosure relates to an audio processing apparatus and method for denoising a multi-channel audio signal.

BACKGROUND

There have been some attempts of denoising a multi-channel audio signal, i.e. an audio signal detected by a plurality of audio sensors, using neural networks, for instance, in speech recognition applications. In some of these known approaches a recurrent neural network is used to estimate the mixing coefficients of the different channels of the audio channels and to perform denoising using the mixing coefficients.

Although the known approaches already provide some advantages, there is still a need for an improved audio processing apparatus and method for denoising a multi-channel audio signal.

SUMMARY

It is an object of the disclosure to provide an improved audio processing apparatus and method allowing for an improved enhancement of a noisy multi-channel audio signal.

The foregoing and other objects are achieved by the subject matter of the independent claims. Further implementation forms and embodiments are apparent from the dependent claims, the description and the figures.

Generally, implementation forms and embodiments of the disclosure are based on the idea of combining multi-channel enhancing and denoising into one model. First, the model computes channel mixing weights for each time-frequency component of a multi-channel audio signal, then mixes all channels using the mixing weights and, finally, denoises the resulting single channel. In contrast to previous conventional approaches, which employ a recurrent neural network to estimate the mixing coefficients of the different channels of an audio signal, implementation forms and embodiments of the disclosure make use of a novel self-attention mechanism that represents every time-frequency bin of a multi-channel audio signal in every channel in a manner that is aware of all time-frequency bins in all other channels. This novel self-attention mechanism allows representing each time-frequency bin for each channel in a manner that is aware of all other time-frequency bins in all channels. Thus, the novel self-attention mechanism employed by embodiments of the disclosure attends to other locations in the input data, while representing other locations, which results in a better representation of the multi-channel spectrum.

More specifically, according to a first aspect the disclosure relates to an audio processing apparatus, comprising a plurality of spatially separated audio sensors, wherein each audio sensor is configured to receive a respective plurality of audio frames of an audio signal from an audio source, wherein the respective plurality of audio frames defines an audio channel of the audio signal from the audio source. Moreover, the audio processing apparatus comprises processing circuitry configured to: determine, i.e. extract a respective feature set having at least one feature for each audio frame of each of the plurality of audio frames, wherein the plurality of features define a three-dimensional feature array; process the three-dimensional feature array using a neural network (herein also referred to as "rotational self-attention block"), wherein the neural network comprises a self-attention layer configured to process a plurality of two-dimensional sub-arrays of the three-dimensional feature array; and generate a denoised single-channel output signal on the basis of the plurality of processed two-dimensional sub-arrays.

In a further possible implementation form of the first aspect, the respective feature set for each audio frame of each of the plurality of audio frames comprises a spectral representation, in particular a log spectrum of the audio frame.

In a further possible implementation form of the first aspect, the three-dimensional feature array has a dimension corresponding to time represented by a time stamp, a dimension corresponding to frequency and a dimension corresponding to the audio channel.

In a further possible implementation form of the first aspect, the two-dimensional sub-arrays of the three-dimensional feature array comprise one or more two-dimensional sub-arrays for a given time stamp, one or more two-dimensional sub-arrays for a given frequency and/or one or more two-dimensional sub-arrays for a given audio channel.

In a further possible implementation form of the first aspect, the processing circuitry is configured to generate the output signal on the basis of the plurality of processed two-dimensional sub-arrays by mixing the plurality of audio channels on the basis of a plurality of channel weights, time stamp weights and/or frequency weights.

In a further possible implementation form of the first aspect, the processing circuitry is configured to determine the plurality of channel weights by applying a normalization over the plurality of audio channels.

In a further possible implementation form of the first aspect, the processing circuitry is further configured to generate a denoising mask on the basis of the mixed audio channels.

In a further possible implementation form of the first aspect, the processing circuitry is further configured to apply the denoising mask to the mixed audio channels for generating the output signal.

In a further possible implementation form of the first aspect, the neural network is configured to process the plurality of two-dimensional sub-arrays of the three-dimensional feature array into a processed three-dimensional feature array, wherein the processing circuitry is configured to generate the denoised single-channel output signal on the basis of the processed three-dimensional feature array.

In a further possible implementation form of the first aspect, the processing circuitry is configured to train the self-attention layer on the basis of a plurality of pairs of noisy multi-channel training audio signals and clean single channel training output signals.

In a further possible implementation form of the first aspect, the processing circuitry is configured to train the self-attention layer by minimizing a difference measure, in particular the L2 loss between a spectral representation, in particular a log spectrum of the output signal generated by the processing circuitry on the basis of a respective training audio signal and a spectral representation, in particular a log spectrum of a respective training output signal. In an embodiment, the processing circuitry is configured to minimize the difference measure using a gradient-based optimization algorithm.

In a further possible implementation form of the first aspect, the processing circuitry is configured to extract phase information from one of the plurality of audio channels and to generate the output signal on the basis of the plurality of processed two-dimensional sub-arrays and the extracted phase information.

In a further possible implementation form of the first aspect, the processing circuitry is configured to determine the audio sensor closest to the audio source and to extract the phase information from the audio channel defined by the audio sensor closest to the audio source for generating the output signal.

According to a second aspect the disclosure relates to a corresponding audio processing method, comprising the steps of: receiving a respective plurality of audio frames of an audio signal from an audio source, wherein the respective plurality of audio frames defines an audio channel of the audio signal from the audio source; determining, i.e. extracting a respective feature set having at least one feature for each audio frame of each of the plurality of audio frames, wherein the plurality of features define a three-dimensional feature array; processing the three-dimensional feature array using a neural network, wherein the neural network comprises a self-attention layer configured to process a plurality of two-dimensional sub-arrays of the three-dimensional feature array; and generating a de-noised single channel output signal on the basis of the plurality of processed two-dimensional sub-arrays of the three-dimensional feature array.

The audio processing method according to the second aspect of the disclosure can be performed by the audio processing apparatus according to the first aspect of the disclosure. Further features of the audio processing method according to the second aspect of the disclosure result directly from the functionality of the audio processing apparatus according to the first aspect of the disclosure and its different implementation forms described above and below.

According to a third aspect the disclosure relates to a computer program comprising program code for performing the audio processing method according to the second aspect, when executed on a processor or a computer.

The disclosure can be implemented in hardware and/or software.

BRIEF DESCRIPTION OF THE DRAWINGS

Further embodiments of the disclosure will be described with respect to the following figures, wherein:

FIG. 7 shows a table illustrating the performance of an audio processing apparatus and method according to an embodiment.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the disclosure may be placed. It is understood that other aspects may be utilized and structural or logical changes may be made without departing from the scope of the disclosure. The following detailed description, therefore, is not to be taken in a limiting sense, as the scope of the disclosure is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
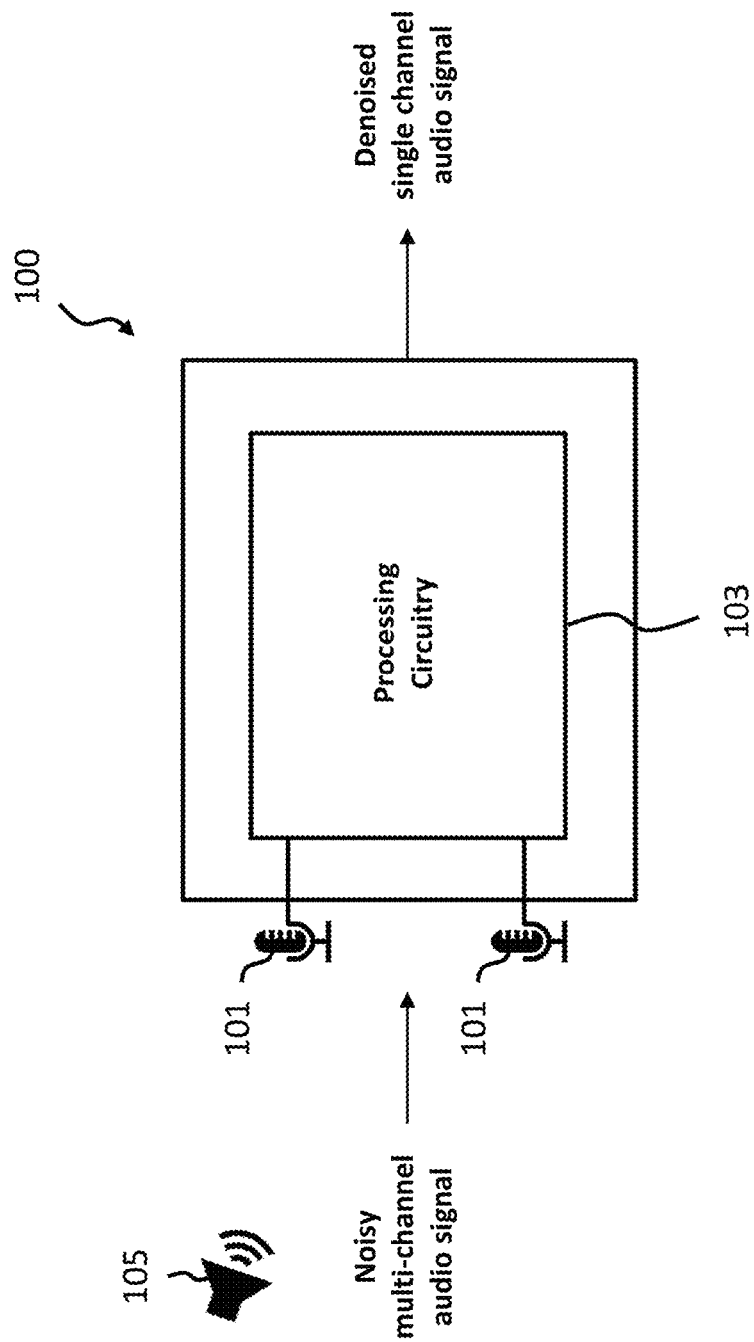
FIG. 1 shows a schematic diagram illustrating an audio processing apparatus according to an embodiment.

FIG. 1 shows a schematic diagram illustrating an audio processing apparatus 100 according to an embodiment. The audio processing apparatus 100, which could be implemented, for instance, as a mobile phone, a phone conference system or the like, comprises a plurality of spatially separated audio sensors, in particular microphones 101 and processing circuitry. The processing circuitry may comprise hardware and software. The hardware may comprise digital circuitry, or both analog and digital circuitry. Digital circuitry may comprise components such as application-specific integrated circuits (ASICs), field-programmable arrays (FPGAs), digital signal processors (DSPs), or general-purpose processors. In one embodiment, the processing circuitry comprises one or more processors and a non-transitory memory connected to the one or more processors. The non-transitory memory may carry executable program code which, when executed by the one or more processors, causes the apparatus to perform the operations or methods described herein. In the shown example, the processing circuitry is a processor 103.

Each audio sensor 101 is configured to receive a respective plurality of audio frames or segments of an audio signal, for instance, speech from an audio source 105, wherein the respective plurality of audio frames defines an audio channel of the audio signal from the audio source 105. For instance, the two exemplary audio sensors 101 shown in FIG. 1 receive a first channel and a second channel of the audio signal from the audio source 105, respectively. By way of example, one of the two exemplary audio sensors 101 shown in FIG. 1 is closer to the audio source 105 than the other one.

As will be described in more detail further below under further reference to FIGS. 2 to 5, the processing circuitry 103 of the audio processing apparatus 100 is configured to determine, i.e. extract a respective feature set having at least one feature for each audio frame of each of the plurality of audio frames. In an embodiment, the respective feature set for each audio frame of each of the plurality of audio frames comprises a spectral representation, in particular a log spectrum of the audio frame. In an embodiment, all audio signals can be processed by a STFT, using 25 ms audio frames shifted by 10 ms, to extract the spectrum of each recorded audio signal channel, which define the features of the feature sets. As already described above, the spectrum extraction is done for each channel separately.

Figure 2:
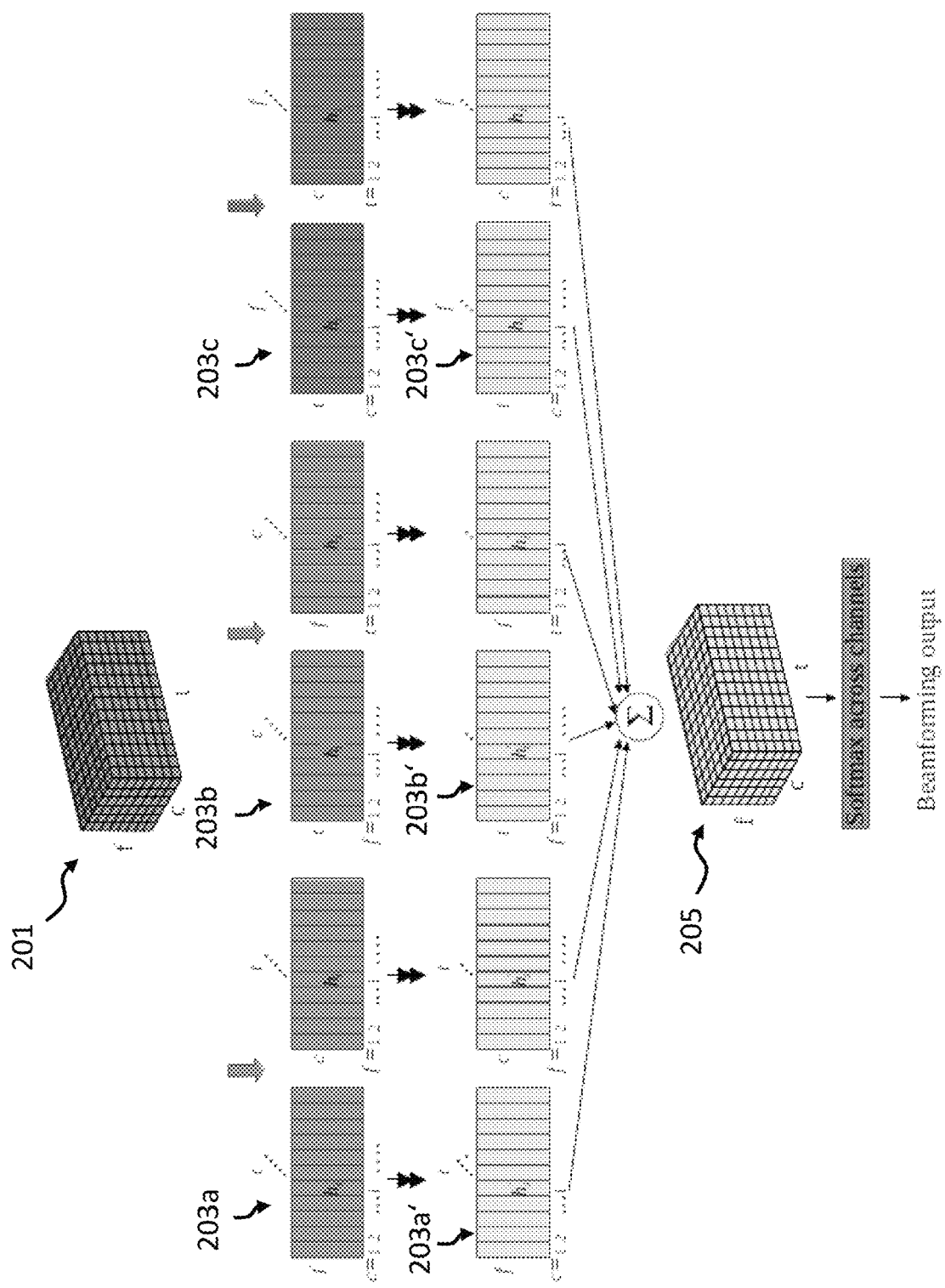
FIG. 2 shows a schematic diagram illustrating processing steps implemented in an audio processing apparatus according to an embodiment.

As illustrated in FIG. 2, the plurality of features of the different feature sets define a three-dimensional feature array 201. In the embodiment shown in FIG. 2, the three-dimensional feature array 201 has a dimension corresponding to time represented by a time stamp t, a dimension corresponding to frequency f and a dimension corresponding to the audio channel c.

Figure 3:
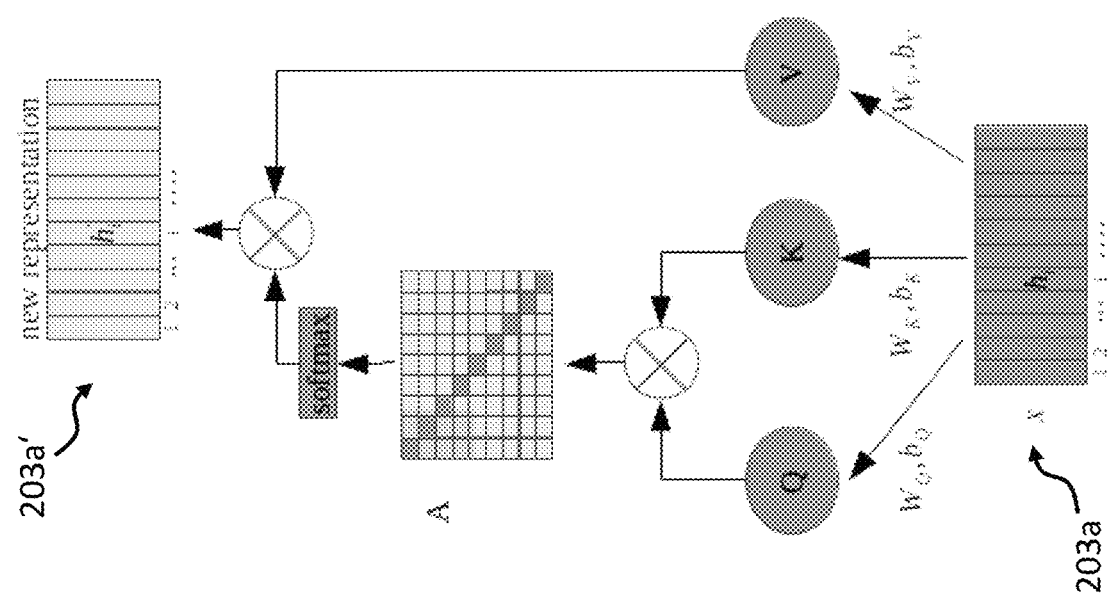
FIG. 3 shows a schematic diagram illustrating a self-attention layer of a neural network implemented in an audio processing apparatus according to an embodiment.

The processing circuitry 103 of the audio processing apparatus 100 is further configured to process the three-dimensional feature array 201 using a neural network (herein also referred to as "rotational self-attention block"), wherein the neural network comprises a self-attention layer configured to process a plurality of two-dimensional sub-arrays 203a-c of the three-dimensional feature array 201. By way of example, FIG. 2 shows six two-dimensional sub-arrays 203a-c of the three-dimensional feature array 201, namely a first and a second two-dimensional sub-array 203a for a respective given time stamp t, a first and a second two-dimensional sub-array 203c for a respective given frequency f and a first and a second two-dimensional sub-array 203b for a respective given audio channel c. As illustrated in FIGS. 2 and 3, each of these two-dimensional sub-arrays 203a-c of the three-dimensional feature array 201 is processed by the self-attention layer of the neural network implemented by the processing circuitry 103 of the audio processing apparatus 100 into a respective processed two-dimensional sub-array 203a'-c'.

Moreover, the processing circuitry 103 of the audio processing apparatus 100 is configured to generate a denoised single-channel output signal on the basis of the plurality of processed two-dimensional sub-arrays 203a'-c'. In an embodiment, the processing circuitry 103 is configured to generate the output signal on the basis of the plurality of processed two-dimensional sub-arrays 203a'-c' by mixing the plurality of audio channels on the basis of a plurality of channel weights, time stamp weights and/or frequency weights.

As illustrated in FIG. 2, the neural network including the self-attention layer is configured to process the plurality of two-dimensional sub-arrays 203a-c of the three-dimensional feature array 201 into the processed two-dimensional sub-arrays 203a'-c' and, subsequently, into a processed three-dimensional feature array 205, wherein the processing circuitry 103 of the audio processing apparatus 100 is configured to generate the denoised single-channel output signal on the basis of the processed three-dimensional feature array 205.

Thus, the audio processing apparatus 100 illustrated in FIGS. 1 to 3 can be considered to comprise a multi-channel enhancing subnetwork that mixes the plurality of audio channels into a single audio channel and a single channel denoising network. As already described above, a main component of the audio processing apparatus 100 is the rotational self-attention block illustrated in FIG. 2. In the embodiment shown in FIG. 2, the rotational self-attention block is comprised of 6 applications of the self-attention layer illustrated in FIG. 3. According to embodiments of the disclosure, the self-attention layer can be implemented similar or identical to self-attention layers of neural networks known from neural machine translation, generating models in computer vision or video classification.

In the following a possible implementation of the self-attention layer of the neural network implemented by the processing circuitry 103 of the audio processing apparatus 100 will be described in more detail under particular reference to FIG. 3.

Given a matrix x of shape [locations×features], three learnable linear transformations are applied to this matrix to obtain a query matrix Q, a key matrix K, and a value matrix V defined by the following equations:

$$Q = xW_Q + b_Q, K = xW_K + b_K, V = xW_V + b_V,$$

wherein $W_Q$, $W_K$, $W_V$ denotes learnable weights of shapes [features×d1], [features×d1], [features×features] respectively, and $b_Q$, $b_K$, $b_V$ denote learnable biases of shapes [d1], [d1], [features] respectively. Adding the bias vectors to the result of the matrix multiplication can be done using standard broadcasting (the bias vector can be added to each row of the matrix). This results in the matrices Q, K, V of shapes [locations×d1], [locations×d1], [locations×features] respectively (in an embodiment d1=20).

Thereafter, the inner product of each row in the query matrix with every row in the key matrix can be computed to get an attention weights matrix A of shape [locations×locations] as defined by the following equation:

$$A_{i,j} = \sum_{r=1}^{d1} Q_{ir} K_{jr}$$

Each row of the matrix A can be normalized using a softmax normalization to get a new matrix A' of shape [locations×locations], as defined by the following equation:

$$A'_{ij} = \frac{e^{A_{ij}}}{\sum_{r=1}^{locations} e^{A_{ir}}}$$

Thereafter, each row in the attention weight matrix can be used weights in a weighted sum of the values matrix, eventually getting the self-attention output matrix B of shape [locations×features], as defined by the following equation:

$$B_i = \sum_{r=1}^{locations} V_r A'_{ir}$$

Here $B_i$ denotes row i of the matrix B and $V_r$ denotes row r of the matrix V. As illustrated in FIG. 3, the matrix B can be the processed two-dimensional sub-array 203a' based on the original two-dimensional sub-array 203a corresponding to the matrix x.

As already described above, the self-attention block illustrated in FIG. 2 takes an array of locations (i.e., the three-dimensional feature array 201), each represented by a number of features, and creates a new representation for each location. The new representation for a given location is created by attending to all other locations and extracting the relevant information from them for the representation of the given location. In an embodiment, there are 3 axes: time, frequencies and channels. Each of them can be regarded as locations axis or features axis. The locations are not interpreted physical locations, but as the time, frequency, channel bins in a multi-channel spectrogram, i.e. the three-dimensional feature array 201.

As illustrated in FIG. 2, for a given time stamp t, the different frequencies f can be regarded as locations, each represented by the different channels c. A new representation for each frequency component f can be created by attending to all other frequencies (represented by their channels c).

As illustrated in FIG. 2, for a given time stamp t, the different channels c can be regarded as locations, each represented by the different frequencies f. A new representation can be created for each channel c, by attending to all other channels (represented by their frequencies f).

As illustrated in FIG. 2, for a given frequency f, the different time stamps t can be regarded as locations, each represented by the different channels c. A new representation can be created for each time stamp t, by attending to all other time stamps (represented by their channels c).

As illustrated in FIG. 2, for a given frequency f, the different time channels c can be regarded as locations, each represented by the different time stamps t. A new representation can be created for each channel c, by attending to all other channels (represented by their time stamps t).

As illustrated in FIG. 2, for a given channel c, the different frequencies f can be regarded as locations, each represented by the time stamps t. A new representation for each frequency component f can be created by attending to all other frequencies (represented by their time stamps t).

As illustrated in FIG. 2, for a given channel c, the different time stamps t can be regarded as locations, each represented by the different frequencies f. A new representation can be created for each time stamp t by attending to all other time stamps t (represented by their frequencies f).

Thus, in the embodiment illustrated in FIG. 2 the representation of the multichannel audio, i.e. the three-dimensional feature array 201 has the shape [time×frequencies×channels]. The self-attention block shown in FIG. 3 is applied 6 times (applying the necessary transposition to the three-dimensional feature array 201). More specifically, for each two-dimensional sub-array of shape [frequencies×channels]; for each two-dimensional sub-array of shape [channels×frequencies]; for each two-dimensional sub-array of shape [time×channels]; for each two-dimensional sub-array of shape [channels×time]; for each two-dimensional sub-array of shape [time×frequencies]; and for each two-dimensional sub-array of shape [frequencies×time].

In an embodiment, each of the 6 resulting sub-arrays 203a'-c' is transposed back to the shape [time×frequencies×channels] and all the results are added to obtain the processed three-dimensional feature array 205 as the output of the rotational self-attention block illustrated in FIG. 2.

Figure 4:
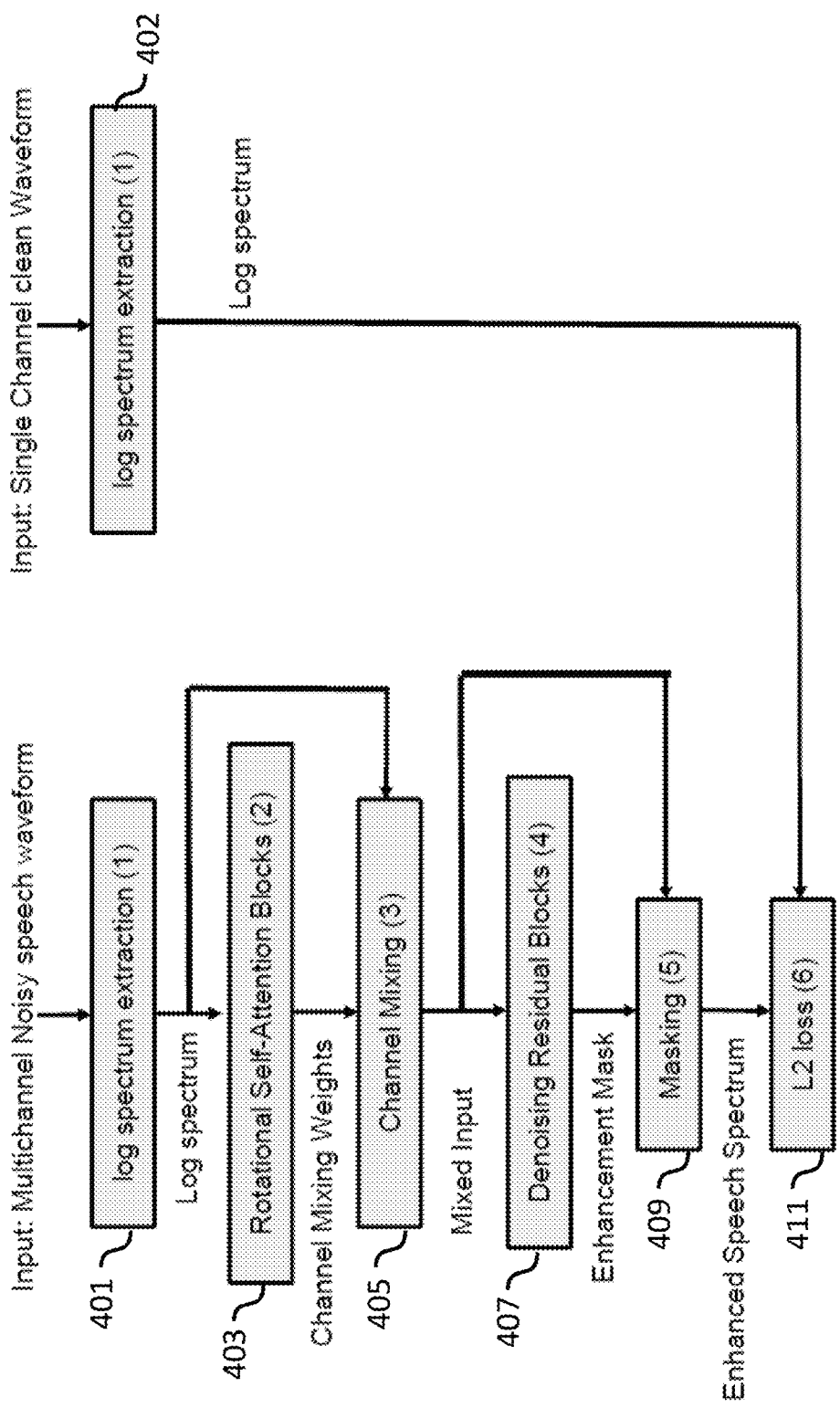
FIG. 4 shows a schematic diagram illustrating an example of processing blocks implemented in an audio processing apparatus according to an embodiment in a training phase.
Figure 5:
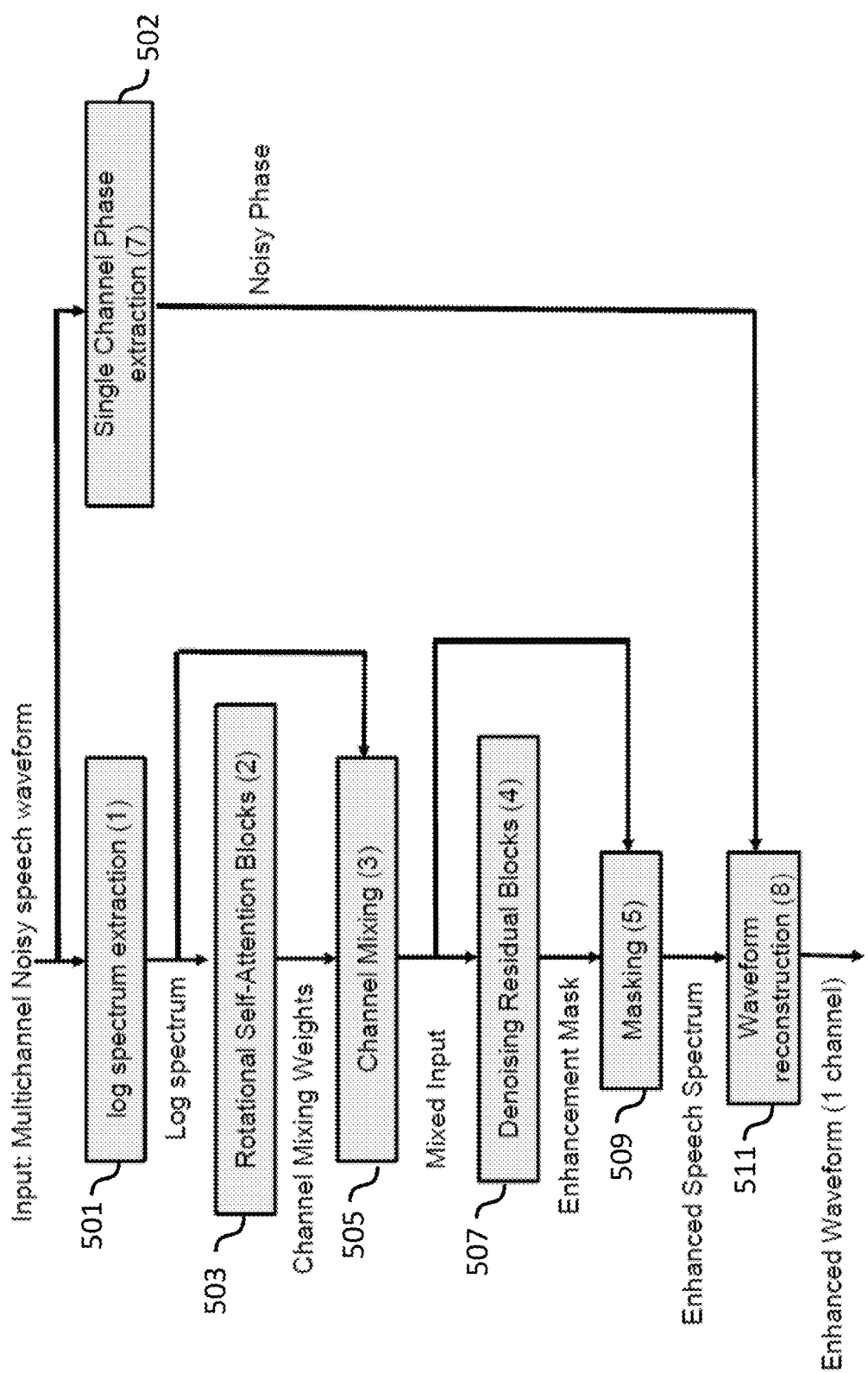
FIG. 5 shows a schematic diagram illustrating an example of processing blocks implemented in an audio processing apparatus according to an embodiment in an application phase.

FIG. 4 shows a schematic diagram illustrating an example of processing blocks implemented in the audio processing apparatus 100 according to an embodiment in a training stage, while FIG. 5 shows a schematic diagram illustrating an example of processing blocks implemented in the audio processing apparatus according to an embodiment in an application stage. As will be appreciated, some of the processing blocks illustrated in FIGS. 4 and 5 already have been described above, such as the spectrum extraction processing blocks 401, 402, 501. In the training stage shown in FIG. 4, the neural network implemented by the processing circuitry 103 of the audio processing apparatus 100 according to an embodiment is trained using two inputs, namely (i) a (known) multi-channel noisy audio signal, for instance, speech segment and (ii) the clean, i.e. denoised audio signal, for instance, speech.

In an embodiment, the processing block 403, 503 of FIGS. 4 and 5 can comprise that the rotational self-attention block is applied three times, such that a rectified non-linearity can be applied after the first and the second rotational self-attention blocks. In an embodiment, a softmax function can be applied during the third rotational self-attention block of processing blocks 403, 503.

As already described above, in an embodiment, the output of the last rotational self-attention block of the processing blocks 403, 503 is a matrix D of shape [time×frequencies×channels]. In an embodiment, to create the channel mixing weights for each time-frequency bin a softmax normalization can be applied on the channels axis as defined by the following equation:

$$D'_{ijk} = \frac{e^{D_{ijk}}}{\sum_{r=1}^{channels} e^{A_{ijr}}}$$

This results in mixing channels that sum to 1 for each time-frequency bin. The output of the STFT for channel k, which is denoted as $C_k$, has a shape of [time×frequencies], and in an embodiment the channels are mixed according to the mixing weights as defined by the following equation (corresponding to processing blocks 405 and 505 of FIGS. 4 and 5, respectively):

$$S_{ij} = \sum_{k=1}^{channels} D'_i|_{jk} C_{ijk}$$

The result S is the enhanced single channel noisy audio signal, i.e. segment.

As illustrated by the processing blocks 407, 507 of FIGS. 4 and 5, the enhanced noisy audio is being processed through a series of residual blocks. In an embodiment, a residual block is comprised of two parallel paths. The first path contains two convolutional layers applied one after another, where batch normalization and a rectified-linear non-linearity are applied in between the layers. The second path contains just the identity function. The output of the two paths are summed, and a rectified-linear non-linearity is applied. The output of the processing blocks 407, 507 is the enhancement mask for one channel.

In processing blocks 409, 509 of FIGS. 4 and 5 the enhancement mask is then added to the spectrum of enhanced noisy speech in order to obtain the enhanced spectrum. The following table summarizes some exemplary kernel sizes, strides and number of feature maps for each residual block for the speech segment processing:

| Block ID | Kernel Size | Stride | Feature Maps |
| --- | --- | --- | --- |
| 1 | 4 × 4 | 1 × 1 | 64 |
| 2 | 4 × 4 | 1 × 1 | 64 |
| 3 | 4 × 4 | 2 × 2 | 128 |

-continued

| Block ID | Kernel Size | Stride | Feature Maps |
|---|---|---|---|
| 4 | 4 × 4 | 1 × 1 | 128 |
| 5 | 3 × 3 | 2 × 2 | 256 |
| 6 | 3 × 3 | 1 × 1 | 256 |
| 7 | 3 × 3 | 2 × 2 | 512 |
| 8 | 3 × 3 | 1 × 1 | 512 |

In a final processing stage, the resulting output is attended across all spatial location into a single vector having, for instance, 13,312 entries. The vector is processed through a fully connected layer with, for instance, 201 output units. These exemplary 201 values are treated as a denoising mask and are added to the central frame of the noisy speech window. The result is the denoised frame, and the output of the neural network implemented by the processing circuitry 103 of the audio processing apparatus 100 according to an embodiment. In an embodiment, the resulting network contains almost 18,000,000 trainable parameters (as calculated by "Tensorflow" according to the accumulative size of each weight and bias tensor). In an embodiment, the weight matrix of a convolutional layer is of shape [kernel width, kernel length, input channels, outputs channels], and is trained to minimize the mean squared error between the denoised and clean frames (see processing block 411 of FIG. 4). In an embodiment, optimization is done using a stochastic gradient descent with a learning rate of, for instance, 0.01 and a minibatch size of, for instance, 64 windows. At training time, the parameters of the enhancement subnetwork are restored from a pretrained model for single-channel enhancement, and they are fine-tuned at the same time as the parameters for the enhancement subnetwork are being learned.

In an embodiment, a L2 loss is computing the difference between the enhanced and the clean spectrums (see processing block 411 of FIG. 4). In an embodiment, all model parameters are optimized simultaneously using a gradient-based optimization algorithm.

As illustrated by processing block 502 of FIG. 5, in the application stage an additional phase can be extracted from a selected channel of the noisy multichannel audio signal, in particular the channel closest to the audio source 105. The phase is then used together with the enhanced spectrum to reconstruct a single channel enhanced audio signal, i.e. waveform (see processing block 511 of FIG. 5).

Figure 6:
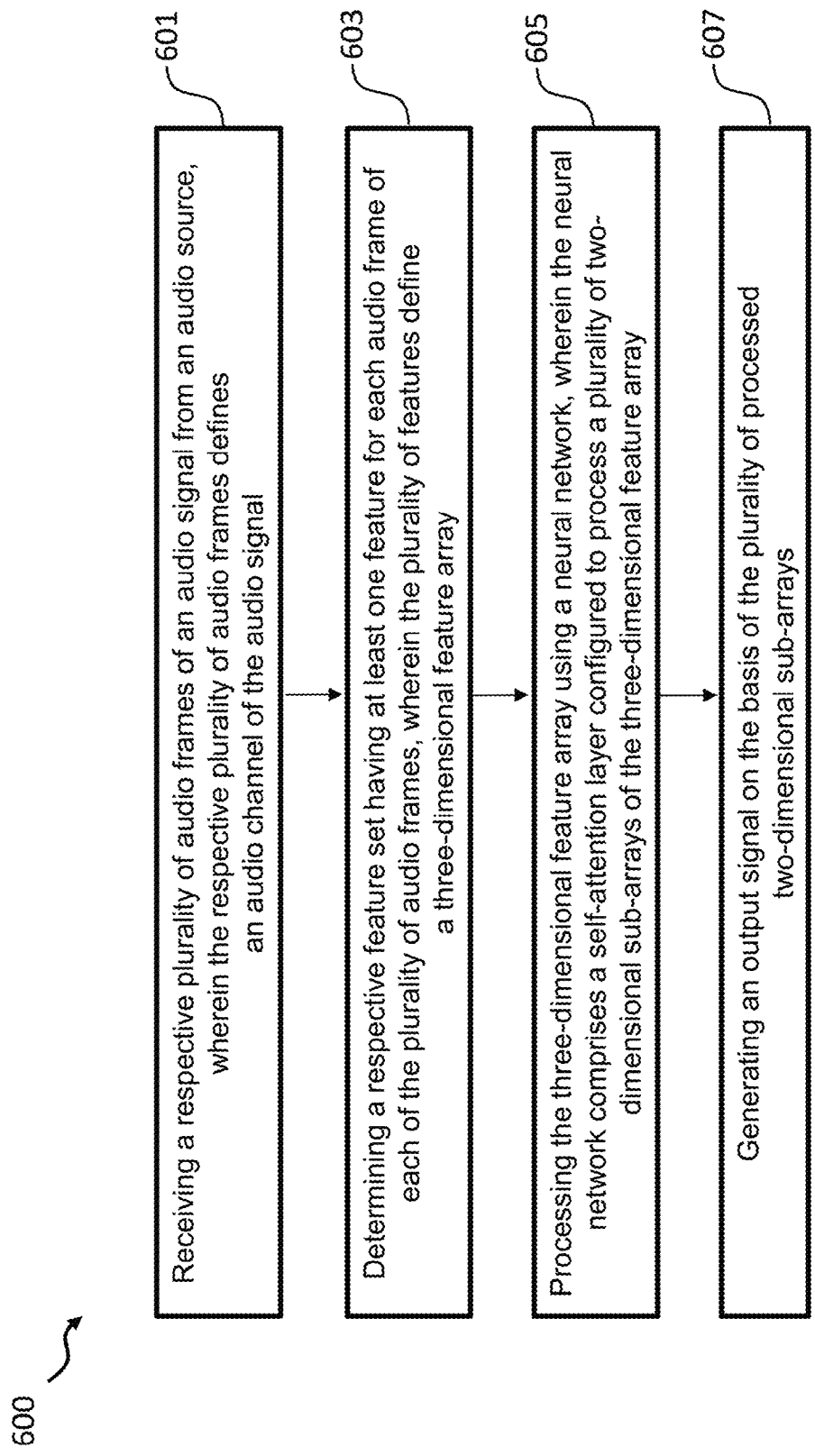
FIG. 6 shows a flow diagram illustrating an example of an audio processing method according to an embodiment.

FIG. 6 shows a flow diagram illustrating an example of a corresponding audio processing method 600 according to an embodiment. In an embodiment, the audio processing method 600 can be performed by the audio processing apparatus 100 described above and below.

The audio processing method 600 comprises the following steps: a first step 601 of receiving a respective plurality of audio frames of an audio signal from the audio source 105, wherein the respective plurality of audio frames defines an audio channel of the audio signal from the audio source 105; a second step 603 of determining, i.e. extracting a respective feature set having at least one feature for each audio frame of each of the plurality of audio frames, wherein the plurality of features define a three-dimensional feature array 201; a third step 605 of processing the three-dimensional feature array 301 using a neural network, wherein the neural network comprises a self-attention layer configured to process a plurality of two-dimensional sub-arrays 203a-c of the three-dimensional feature array 201; and a fourth step 607 of generating a de-noised single channel output signal on the basis of the plurality of processed two-dimensional sub-arrays 203a'-c' of the three-dimensional feature array 201.

In the following, some results illustrating the performance of the audio processing apparatus 100 according to an embodiment and the audio processing method 600 according to an embodiment will be described in more detail.

For evaluating the audio processing apparatus 100 according to an embodiment and the audio processing method 600 according to an embodiment the neural network was trained for about 4 days and the publicly available pretrained speech recognition scheme known as "Baidu Deep Speech system" was used. For a better analysis of the performance, the following versions of the Librispeech test set have been evaluated.

Firstly, denoised enhanced single-channel audio frames have been used, which are the output of the audio processing apparatus 100 according to an embodiment, together with the phase of a selected noisy channel, to reconstruct a waveform (inverse STFT). This setting evaluates the performance of the audio processing apparatus 100 according to an embodiment as a whole, including both the enhancing subnetwork and the single-channel denoising subnetwork.

Secondly, the enhanced single channel noisy audio (after training the entire neural network) is used together with the phase of a selected noisy channel to reconstruct a waveform. This setting evaluates the contribution of the enhancing subnetwork.

The pretrained single-channel denoiser is run on a selected channel and fine-tuned on the trained data. This setting evaluates the contribution of the single-channel denoising subnetwork.

Moreover, a baseline filter-and-sum beamformer is used, for instance the publically available "BeamformIt" (https://github.com/xanguera/BeamformIt).

Finally, the denoised enhanced single-channel audio frames, already used above, are used together with the phase of a selected noisy channel to reconstruct a waveform (inverse STFT), where the rotational self-attention block is applied only once, instead of three times.

FIG. 7 shows a table summarizes the performance of the audio processing apparatus 100 and the audio processing method 600 according to an embodiment with the settings described above using a word error rate, WER, measure.

The person skilled in the art will understand that the "blocks" ("units") of the various figures (method and apparatus) represent or describe functionalities of embodiments of the disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

What is claimed is:

1. An audio processing apparatus, comprising:
   a plurality of audio sensors, wherein each audio sensor of the plurality of audio sensors is configured to receive a respective plurality of audio frames of an audio signal from an audio source, wherein for each audio sensor of the plurality of audio sensors, the respective plurality of audio frames for the audio sensor defines an audio channel of the audio signal; and
   a processing circuitry configured to:
   for each audio channel of the audio signal, determine a respective feature set having at least one feature for each audio frame of the respective plurality of audio frames for the audio channel, wherein the respective feature sets corresponding to the audio channels define a three-dimensional feature array;
   process the three-dimensional feature array using a neural network, wherein the neural network comprises a self-attention layer configured to process a plurality of two-dimensional sub-arrays of the three-dimensional feature array to generate a plurality of processed two-dimensional sub-arrays;
   extract phase information from one audio channel of a plurality of audio channels of the audio signal; and
   generate a denoised output audio signal based on the plurality of processed two-dimensional sub-arrays and the phase information.

2. The audio processing apparatus of claim 1, wherein a respective feature set for a given audio frame comprises a spectral representation of the given audio frame.

3. The audio processing apparatus of claim 1, wherein the three-dimensional feature array has a dimension corresponding to time represented by a time stamp, a dimension corresponding to frequency, and a dimension corresponding to an audio channel of the audio signal.

4. The audio processing apparatus of claim 3, wherein the two-dimensional sub-arrays comprise one or more two-dimensional sub-arrays for a given time stamp, one or more two-dimensional sub-arrays for a given frequency, and/or one or more two-dimensional sub-arrays for a given audio channel of the audio signal.

5. The audio processing apparatus of claim 1, wherein generating the denoised output audio signal comprises:
   generating the denoised output audio signal by mixing a plurality of audio channels of the audio signal based on a plurality of channel weights, time stamp weights, and/or frequency weights to generate mixed audio channels.

6. The audio processing apparatus of claim 5, wherein the processing circuitry is further configured to:
   determine the plurality of channel weights by applying a normalization over the plurality of audio channels.

7. The audio processing apparatus of claim 5, wherein the processing circuitry is further configured to:
   generate a denoising mask based on the mixed audio channels.

8. The audio processing apparatus of claim 7, wherein the processing circuitry is further configured to:
   apply the denoising mask to the mixed audio channels for generating the denoised output audio signal.

9. The audio processing apparatus of claim 1,
   wherein the neural network is configured to process the plurality of two-dimensional sub-arrays of the three-dimensional feature array into a processed three-dimensional feature array; and
   wherein generating the denoised output audio signal is further based on the processed three-dimensional feature array.

10. The audio processing apparatus of claim 1, wherein the processing circuitry is further configured to:
    train the self-attention layer based on a plurality of pairs of training audio signals and training output signals.

11. The audio processing apparatus of claim 10, wherein the processing circuitry is further configured to:
    train the self-attention layer by minimizing a difference measure between a spectral representation of an output signal generated by the processing circuitry based on a respective training audio signal and a spectral representation of a respective training output signal.

12. The audio processing apparatus of claim 1, wherein the processing circuitry is further configured to:
    determine a first audio sensor among the plurality of audio sensors is closest to the audio source; and
    extract the phase information from a first audio channel corresponding to the first audio sensor that is closest to the audio source.

13. An audio processing method, comprising:
    receiving a respective plurality of audio frames of an audio signal from an audio source, wherein for each audio sensor of the plurality of audio sensors, the respective plurality of audio frames for the audio sensor defines an audio channel of the audio signal;
    for each audio channel of the audio signal, determining a respective feature set having at least one feature for each audio frame of the respective plurality of audio frames for the audio channel, wherein the respective feature sets corresponding to the audio channels define a three-dimensional feature array;
    processing the three-dimensional feature array using a neural network, wherein the neural network comprises a self-attention layer configured to process a plurality of two-dimensional sub-arrays of the three-dimensional feature array to generate a plurality of processed two-dimensional sub-arrays;
    extracting phase information from one audio channel of a plurality of audio channels of the audio signal; and
    generating a denoised output audio signal based on the plurality of processed two-dimensional sub-arrays and the phase information.

14. A non-transitory computer-readable storage medium storing program code that, when executed by a processor, causes a computer to perform steps comprising:
    receiving a respective plurality of audio frames of an audio signal from an audio source, wherein for each audio sensor of the plurality of audio sensors, the respective plurality of audio frames for the audio sensor defines an audio channel of the audio signal;
    for each audio channel of the audio signal, determining a respective feature set having at least one feature for each audio frame of the respective plurality of audio frames for the audio channel, wherein the respective feature sets corresponding to the audio channels define a three-dimensional feature array;

processing the three-dimensional feature array using a neural network, wherein the neural network comprises a self-attention layer configured to process a plurality of two-dimensional sub-arrays of the three-dimensional feature array to generate a plurality of processed two-dimensional sub-arrays;
extracting phase information from one audio channel of a plurality of audio channels of the audio signal; and
generating a denoised output audio signal based on the plurality of processed two-dimensional sub-arrays and the phase information.

\* \* \* \* \*